United States Patent
Schumacher et al.

(10) Patent No.: US 7,519,823 B1
(45) Date of Patent: Apr. 14, 2009

(54) CONCEALED, NON-INTRUSIVE WATERMARKS FOR CONFIGURATION BITSTREAMS

(75) Inventors: Paul R. Schumacher, Berthoud, CO (US); Robert D. Turney, Watertown, WI (US); Mark Paluszkiewicz, Schaumburg, IL (US); Prasanna Sundararajan, Mountain View, CA (US); Brandon J. Blodget, Santa Clara, CA (US)

(73) Assignee: XILINX, Inc., San Jose, CA (US)

( * ) Notice: Subject to any disclaimer, the term of this patent is extended or adjusted under 35 U.S.C. 154(b) by 866 days.

(21) Appl. No.: 10/917,042

(22) Filed: Aug. 12, 2004

(51) Int. Cl.
  *H04L 9/00* (2006.01)
(52) U.S. Cl. .................. 713/176; 713/1; 713/2; 713/100; 713/168; 713/189; 380/268; 716/16; 716/17; 716/18
(58) Field of Classification Search .............. 713/189, 713/176, 1, 2, 100, 168; 716/16–18; 380/268
  See application file for complete search history.

(56) References Cited

U.S. PATENT DOCUMENTS

| | | | |
|---|---|---|---|
| 5,649,176 A | 7/1997 | Selvidge et al. | |
| 5,764,076 A | 6/1998 | Lee et al. | |
| 5,802,290 A | 9/1998 | Casselman | |
| 5,946,219 A | 8/1999 | Mason et al. | |
| 6,115,034 A | 9/2000 | Tanaka et al. | |
| 6,205,574 B1 | 3/2001 | Dellinger et al. | |
| 6,301,695 B1 | 10/2001 | Burnham et al. | |
| 6,305,005 B1 | 10/2001 | Burnham | |
| 6,421,450 B2 * | 7/2002 | Nakano ................. 382/100 | |
| 6,525,557 B1 | 2/2003 | McManus et al. | |
| 6,571,382 B1 | 5/2003 | Kim et al. | |
| 6,678,646 B1 | 1/2004 | McConnell et al. | |
| 6,711,674 B1 | 3/2004 | Burnham | |
| 6,747,478 B2 | 6/2004 | Madurawe | |
| 6,889,326 B1 * | 5/2005 | Charbon et al. ............ 713/176 |
| 6,990,508 B1 | 1/2006 | Mohammed et al. | |
| 7,143,295 B1 | 11/2006 | Trimberger et al. | |
| 7,170,997 B2 * | 1/2007 | Petersen et al. ............ 380/268 |
| 7,219,342 B2 | 5/2007 | Metzgen | |
| 7,231,339 B1 | 6/2007 | Nemecek et al. | |
| 7,278,128 B1 | 10/2007 | Trimberger | |
| 2002/0150252 A1 | 10/2002 | Wong | |
| 2003/0229822 A1 | 12/2003 | Kim et al. | |

OTHER PUBLICATIONS

Carline et al. "A Novel Watermarking Technique for LUT Based FPGA Designs". Springer-Verlag Berlin Heidelberg: 2002.*

(Continued)

*Primary Examiner*—Kambiz Zand
*Assistant Examiner*—Kari L Schmidt
(74) *Attorney, Agent, or Firm*—LeRoy D. Maunu; Lois D. Cartier

(57) ABSTRACT

Various approaches for embedding identifier information in a configuration bitstream for a programmable logic device (PLD) are disclosed. In various embodiments, the bits in the configuration bitstream that are unused in implementing a the design are identified. The identifier information is encrypted, and a subset of the unused bits are selected using a pseudo-random function. The encrypted identifier information is placed in the selected subset of unused bits. Decryption is accomplished by reversing the encryption approach.

19 Claims, 8 Drawing Sheets

OTHER PUBLICATIONS

U.S. Appl. No. 10/917,033, filed Aug. 12, 2004, Patterson et al.
U.S. Appl. No. 10/917,064, filed Aug. 12, 2004, Patterson et al.
Adarsh K. Jain et al.; "Zero Overhead Watermarking Technique for FPGA Designs"; Copyright 2003; GLSVLSI'03; Apr. 28-29, 2003; pp. 1-6.
Wong, Ping et al.; "Secret and Public Key Image Watermarking Schemes for Image Authentication and Ownership Verification"; IEEE Transactions on Image Processing; vol. 10, No. 10; Oct. 2001; Copyright 2001 IEEE; pp. 1593-1601.
Eck, Vince et al.; "In-Circuit Partial Reconfiguration of RocketIO Attributes"; XAPP662 (v2.4); May 26, 2004; Application Note: Virtex-II Pro Family; Copyright 2003-2004; available from Xilinx, Inc., 2100 Logic Drive, San Jose, California 95124; pp. 1-29.
Xilinx, Inc.; "Status and Control Semaphore Registers Using Partial Reconfiguration"; XAPP153; Jun. 7, 1999 (Version 1.0); Application Note; available from Xilinx, Inc., 2100 Logic Drive, San Jose, California 95124; pp. 1-4.
Xilinx, Inc.; "Virtex Series Configuration Architecture User Guide"; XAPP151 (v1.5); Sep. 27, 2000; Application Note: Virtex Series; available from Xilinx, Inc., 2100 Logic Drive, San Jose, California 95124; pp. 1-45.

* cited by examiner

CONCEALED, NON-INTRUSIVE WATERMARKS FOR CONFIGURATION BITSTREAMS

FIELD OF THE INVENTION

The present invention generally relates to watermark information in configuration bitstreams for programmable logic devices (PLDs).

BACKGROUND

Programmable logic devices (PLDs) are becoming increasingly complex and powerful and capable of implementing a wide range of functionality. The power of PLDs in combination with ease of configuration and reconfiguration are factors in the increasing popularity of these devices.

Various security and control issues are increasing in importance as designs become increasingly complex. The costs associated with developing complex designs are great, making these designs targets for theft and infringement. The configuration data, which implements a design and may be used to configure a PLD, may include parts that are derived from licensed designs, as well parts developed by a user at significant expense. A PLD is easily configurable with configuration data. Likewise, the configuration data may be easily read back from the device and deployed on other similar devices. Preventing unauthorized use and exposing piracy of a design may be difficult because the configuration data may be easily copied. Confirming the unauthorized use of a design in a suspected copy may also be difficult.

In addition to configuration data, other information of interest in a complex design may include revision control and design-identifying information. Associating revision and design description information with the configuration data may be desirable. However, in certain situations making this information apparent to an unauthorized observer may be undesirable.

The present invention may address one or more of the above issues.

SUMMARY OF THE INVENTION

The invention provides a number of approaches for embedding identifier information in a configuration bitstream for a programmable logic device (PLD). In various embodiments, the bits in the configuration bitstream that are unused in implementing a design are identified. The identifier information is encrypted, and a subset of the unused bits are selected using a pseudo-random function. The encrypted identifier information is placed in the selected subset of unused bits. Decryption is accomplished by reversing the encryption approach.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

A watermark is typically key-dependent information that is inserted into digital data (e.g., images, audio, bitstreams) and that may later be detected or extracted. One type of watermark is invisible, which means that it is hidden in the digital data and cannot be detected without the aid of a proper detection or extraction device. For example, digital image watermarks have been concealed by putting the watermark in the least significant bit of the intensity values for the pixels of the digital image. A viewer of the image before and after such insertion of the watermark cannot generally discern any difference between the two images. Thus, for the viewer the watermark is hidden, or invisible.

A watermark may also be concealed in a configuration file for an FPGA. While an image may be slightly affected by a concealed watermark, a watermark concealed in a configuration file for a design needs to be non-intrusive, such that the watermark does not affect the function of the design. A user, including an unauthorized user, of a configuration file with a concealed, non-intrusive watermark is oblivious to the presence of the watermark. The watermark may not be detected in the configuration file because the watermark is concealed, and the operation of the design may not be affected because the watermark is non-intrusive.

A concealed non-intrusive watermark may be used for a variety of purposes. For example, the watermark may be used as evidence that a configuration file has been misappropriated when the configuration file or a design using the configuration file is found in the possession of an unlicensed user. The watermark may be used in determining whether a user has permission to use the design. The watermark may also be used in verifying the integrity of a design, for example, verifying that no unauthorized modifications have been made to the design.

The particular information embodied in a concealed non-intrusive watermark may vary according to the application. For example, the watermark may reflect design generation information such as the model number for the hardware platform and version numbers for the software tools. The watermark may further encode the name of the creator of the configuration file or design information for the design. By concealing a watermark in the configuration file, the concealed information is associated with the configuration file.

Figure 1:
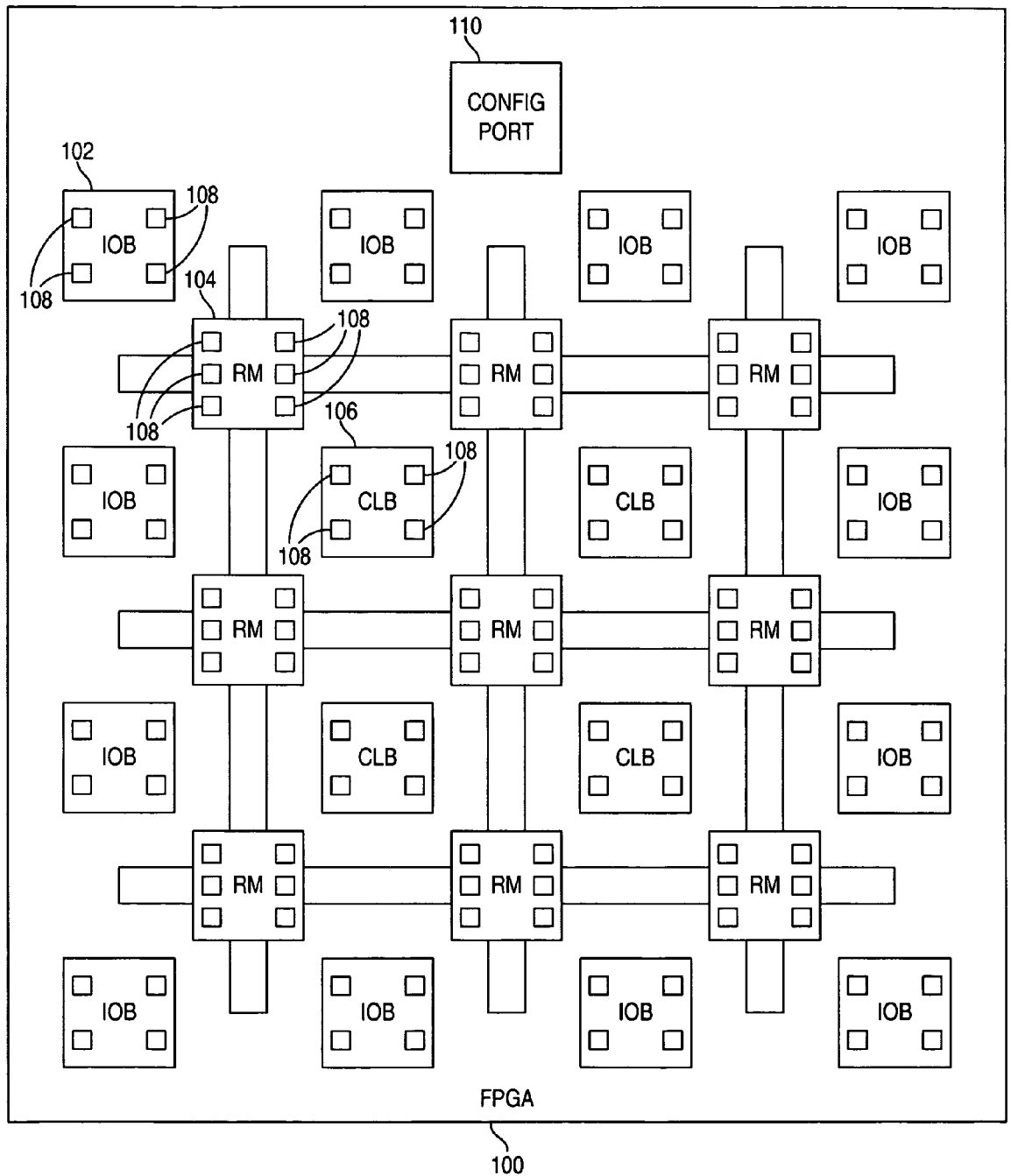
FIG. 1 is block diagram of an example FPGA.

FIG. 1 is block diagram of a simplified example FPGA 100. An array of tiles of types input/output block (IOB) 102, routing matrix (RM) 104, and configurable logic block (CLB) 106 forms the bulk of the FPGA 100. Each of the tiles may be configured to perform a variety of functions. Each tile contains configuration memory cells 108 to configure the function of the tile. The configuration memory cells 108 are also arranged in an array of cells. The configuration memory cells 108 for a particular tile typically span a contiguous two-dimensional portion of the array of configuration memory cells 108.

On power-up of the FPGA 100 the configuration memory cells 108 are automatically cleared and then initialized with a configuration file loaded from a source external to FPGA 100 via the configuration port 110. A configuration file is also sometimes referred to as a configuration bitstream. Because many designs use only a portion of the configurable resources of an FGPA, watermark information may be placed in bits of the configuration file associated with the configuration memory cells of the unused resources.

It will be appreciated that PLDS having different layouts of CLBS, IOBS, and interconnect circuitry (and the functional equivalents thereof) may also implement the various embodiments of the invention described herein.

Figure 2:
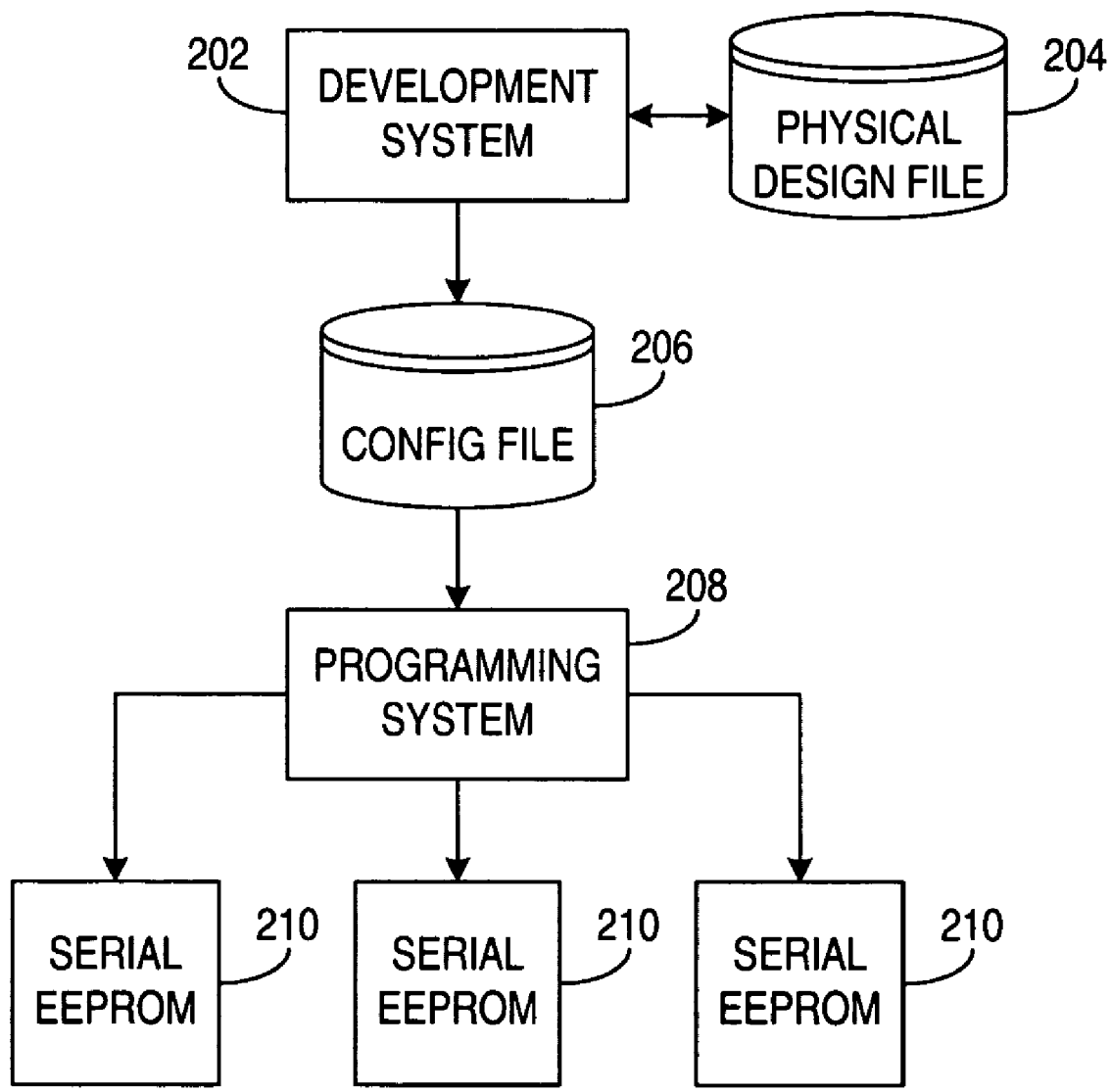
FIG. 2 is a block diagram of an example system for creating configuration data for an FPGA.

FIG. 2 is a block diagram of an example system for creating configuration data for an FPGA. The configuration data is created on a development system 202. The development system 202 may generate the configuration data using synthesis of a design containing internally developed RTL and licensed modules. The development system 202 first generates a physical design file 204 and then uses the physical design file 204 to generate the configuration file 206. During development, the configuration file 206 may be transferred directly to a prototyping FPGA by the development system 202. Once the design is ready for production, a separate programming system 208 is typically used to program a serial EEPROM 210 in each production system with the contents of the configuration file 206.

Figure 3:
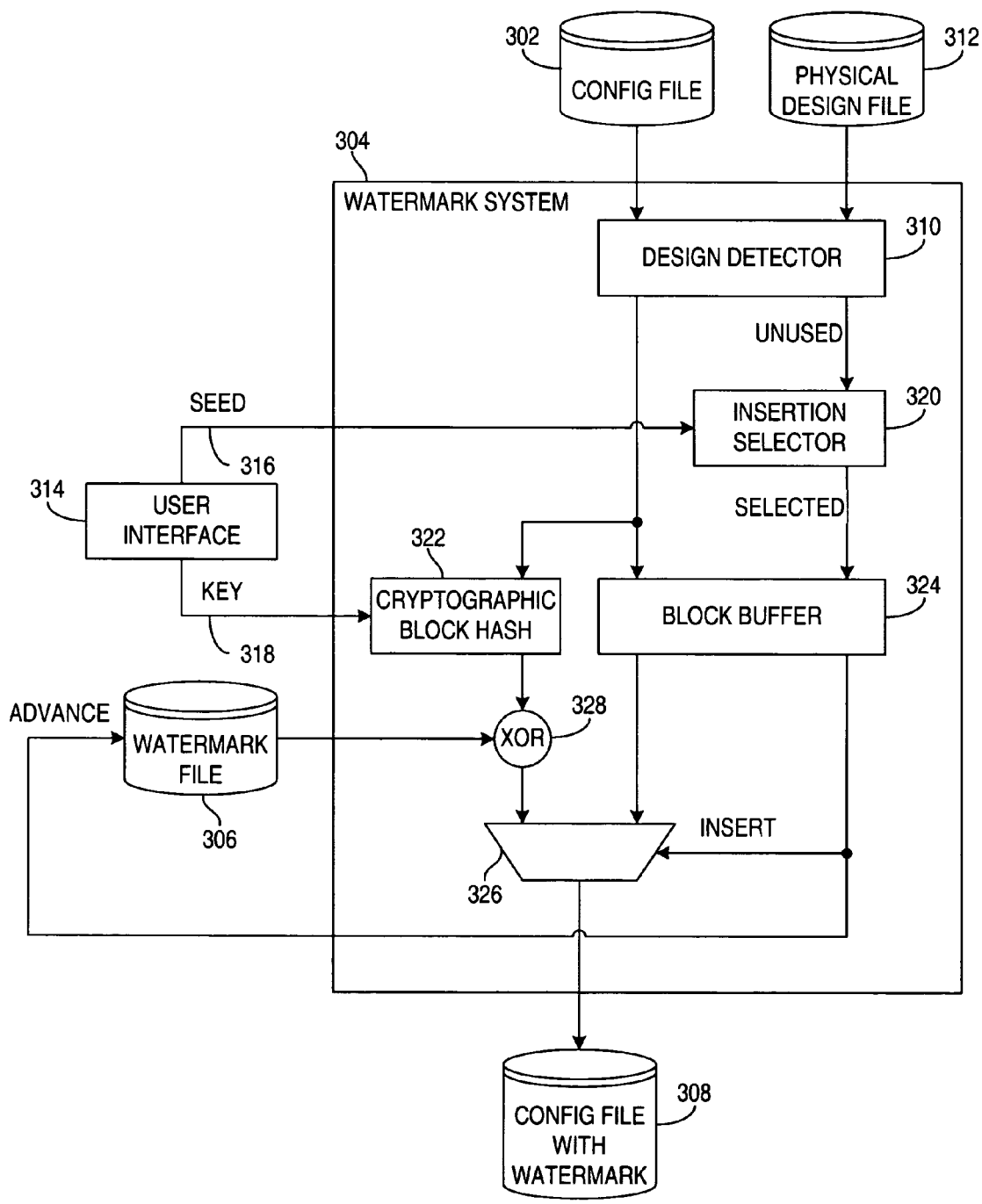
FIG. 3 is a system diagram of an embodiment for inserting a watermark in a configuration file in accordance with various embodiments of the invention.

FIG. 3 is a system diagram that illustrates various embodiments for inserting a watermark in a configuration file 302. A watermark system 304 is used to conceal data from the watermark file 306 non-intrusively within the configuration file 302. The watermark file 306 may be a plain text file or any other implementation-driven type of file.

The configuration file 308 that includes a watermark, when loaded into an FPGA, configures the FPGA to perform the same function as the original configuration file 302. The configuration file 308 with the watermark is functionally equivalent to the original configuration file 302. Thus, the watermark may be inserted into the configuration file 302 in a completely non-intrusive manner. That is, none of the characteristics of the design are lost in the watermarked configuration file 308 nor is the functionality of the FPGA changed.

Many FPGA-based designs use only a portion of the device resources. The bits of configuration memory for a used resource may have a value of either zero or one to define the function of the used resource. The bits of configuration memory for an unused resource are typically set to a default value of zero. For some designs it has been determined that only 30-40% of the configuration memory bits are used to define the function of the design. The remaining 60-70% bits of the configuration memory typically have a default value of zero, but may be given any value in any combination without affecting the function of the design in the FPGA. For example, a look-up table (LUT) in a CLB may be unused in a particular design with its outputs not connected to any other logic in the FPGA. An unconnected LUT can be programmed with any look-up function without affecting the function of the configured design in the FPGA. Since there are megabytes of configuration memory for some FPGAs, a significant amount of information may be concealed as a watermark in a configuration bitstream.

Design detector 310 determines which configuration memory bits are not used to define the function of the design in the FPGA. In one embodiment, the design detector 310 determines the unused bits from the physical design file 312. The physical design file 312 is a database that describes the resource usage within the FPGA. The design detector 310 outputs the unmodified bitstream of the configuration file 302 along with a synchronized output that identifies the unused configuration memory bits.

The watermark system 304 has a user interface 314 to provide user inputs to the watermark system 304. Two of these user inputs are the seed 316 and the key 318. The seed 316 is provided to the insertion selector 320 and the key 318 is provided to the cryptographic hash 322. In one embodiment the seed 316 and the key 318 are identical. In another embodiment the seed 316 is a portion of the key 318.

The insertion selector 320 selects a subset of the bits identified by the design detector 310 as unused configuration memory bits for insertion of the watermark. The seed 316 is used to determine which unused bits are selected. The watermark is inserted in this selected subset of unused bits. In an alternative embodiment, all unused bits are candidates for watermark insertion and the insertion selector may be eliminated.

The watermark system 304 uses cryptographic hash block 322 to encrypt the data from the watermark file 306. The key 318 and the bitstream from the design detector 310 comprise the inputs to the cryptographic hash 322. The cryptographic hash function implemented by cryptographic hash block 322 may also have additional internally generated inputs. To enable later extraction of the watermark, the selected bits must be given a known value before being input into the cryptographic hash 322. In one embodiment, the unused bits, including the selected bits, have the known default value of zero in the configuration file 302. In another embodiment, each selected bit may have any value and this value is masked before being input to the cryptographic hash 322.

The cryptographic hash block 322 outputs a data stream that resembles random noise. The cryptographic hash 322 operates on blocks of configuration data so that a hashed output is not generated until an entire block of configuration data is consumed by the cryptographic hash 322. The block buffer 324 is a FIFO holding a block of configuration data and a block of watermark selection bits. The block buffer 324 outputs the unmodified configuration bitstream and watermark selection bits synchronized with the output of the cryptographic hash 322.

The multiplexer 326 outputs an unmodified bit of the configuration bitstream from configuration file 302 when the bit has not been selected for watermark insertion. For a bit of the configuration bitstream that has been selected for watermark insertion, the output of the XOR gate 328 is output by the multiplexer 326. The output of the multiplexer 326 is stored as the watermarked configuration file 308. After each bit selected for watermark insertion, the watermark file 306 is advanced to output the next bit of the watermark file 306. The output of the XOR gate 328 is scrambled data from the watermark file 306 and resembles random noise.

The operations of the watermark system 304 may be performed in a pipelined arrangement such that writing of portions of the watermarked configuration file 308 begins before the entire configuration file 302 has been read and watermarked. In another embodiment, the watermark system is arranged to perform one step at a time with intermediate files output from each step.

In one embodiment, the watermark system 304 may be an operational component of the development system 202. During the mapping operation that generates the configuration file 302 from the physical design file 312 by the development system, a map of the used (or unused) configuration memory bits is saved in a file (not shown). This file containing a map of unused configuration bits may be used as an alternative to the physical design file 312 as an input to the watermark system 304.

Figure 4:
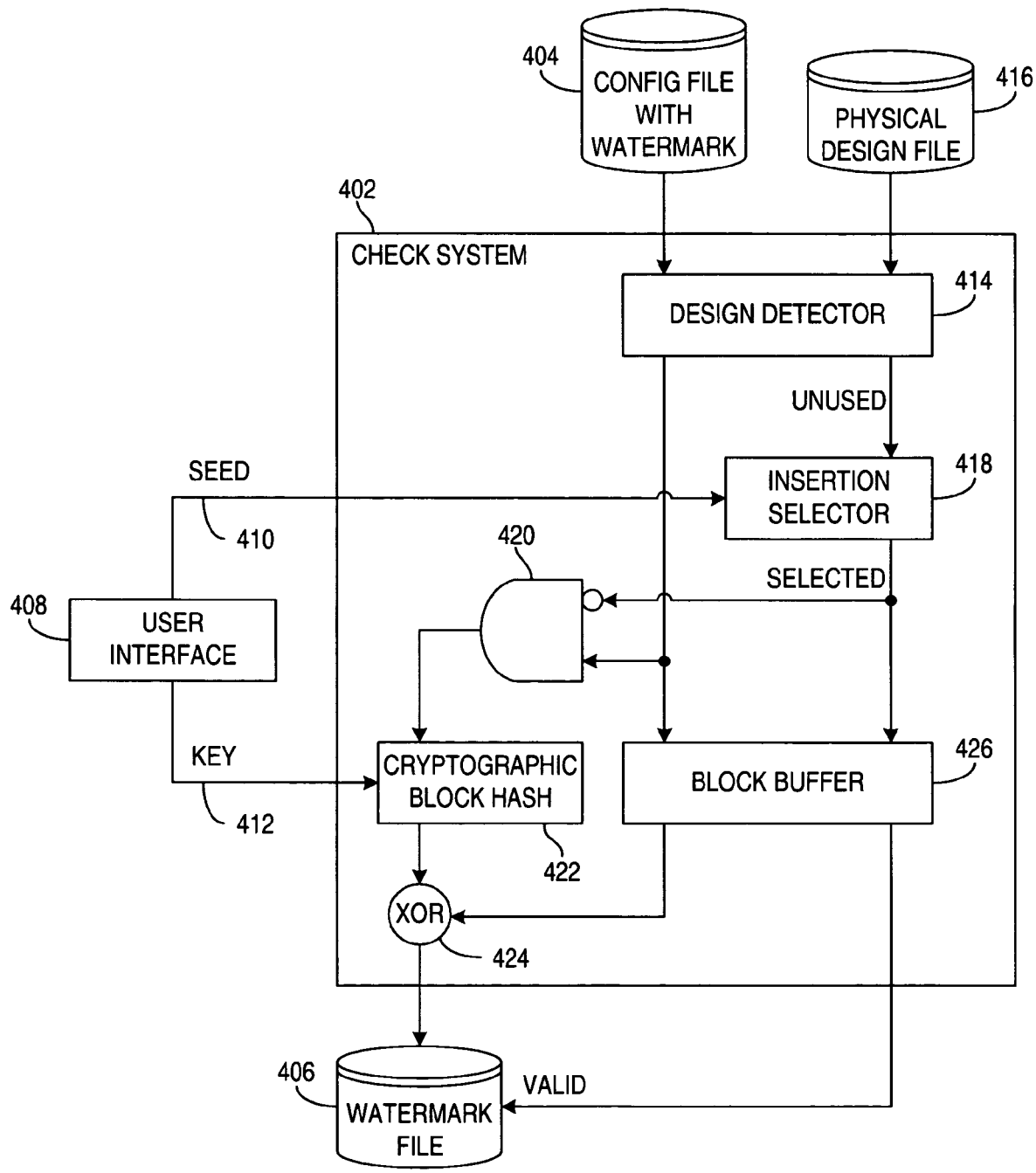
FIG. 4 is a system diagram of an embodiment for extracting a watermark from a configuration file in accordance with various embodiments of the invention.

FIG. 4 is a system diagram for extracting a watermark from a configuration file in accordance with various embodiments of the invention. The check system 402 reads the watermarked configuration file 404, extracts the watermark information, and saves the result as watermark file 406. A user interface 408 allows a user to input a seed 410 and a key 412 to the check system 402. For the watermark information to be successfully extracted, the seed 410 and the key 412 must be the same as the seed and key used to insert the watermark. If the wrong seed 410 is used or the wrong key 412 is used, the extracted watermark may be unrecognizable. If the extraction of a watermark is attempted for a configuration file that does not contain a watermark, the extracted watermark will be unrecognizable.

In one embodiment, the design detector 414 uses the physical design file 416 to determine the configuration memory bits that are unused by the design in the watermarked configuration file 404. The physical design file 416 must contain the same resource usage information that was included in the physical design file used to insert the watermark into the watermarked configuration file 404. The physical design file 416 need not be the same file that was used to generate the configuration file with watermark 404. For example, the physical design file 416 may be a database that is updated after the insertion of the watermark into the watermarked configuration 404.

Design detector 414 determines unused bits regardless of the values of the unused bits in the watermarked configuration file 404. During insertion of the watermark, the unused bits in the original configuration file typically have a default value of zero. During extraction of the watermark by the check system 402, even though the unused bits selected for watermark insertion may have a non-zero value, these bits are still detected as unused bits. The design detector 414 outputs unmodified data from the configuration file with watermark 404 along with a synchronized output identifying the unused bits.

The insertion selector 418 selects the subset of the unused bits that are watermark insertion bits in the same manner as the watermark insertion system. The seed 410 is used to select the watermark insertion bits.

The bitstream from the watermarked configuration file 404 is modified by AND gate 420 before delivery to the cryptographic block hash 422. The AND gate 420 masks the value of selected bits to a value of zero while unselected bits are unmodified. After this masking, the bitstream received by the cryptographic block 422 is identical to the bitstream received by the corresponding block 322 in the watermark insertion system. Thus, when the proper key 412 is provided, the cryptographic block 422 generates an identical hash output as the corresponding block 322 in the watermark insertion system 304. The XOR gate 424 reverses the scrambling of the watermark.

The cryptographic block 422 operates on blocks of configuration data. The block buffer 426 is a FIFO that buffers a block of configuration data and a block of selection bits. The outputs of the block buffer 426 are synchronized with the output of the cryptographic block hash 422. For the selection bits, the output of XOR gate 424 provides the unscrambled watermark and these bits are written to the watermark file 406.

The operations of check system 402 may be performed in a pipelined arrangement such that writing to the watermark file 406 may begin before the entire watermarked configuration file 404 has been processed. In another embodiment, the check system 402 may be arranged to perform one step at a time with intermediate files output from each step.

Figure 5:
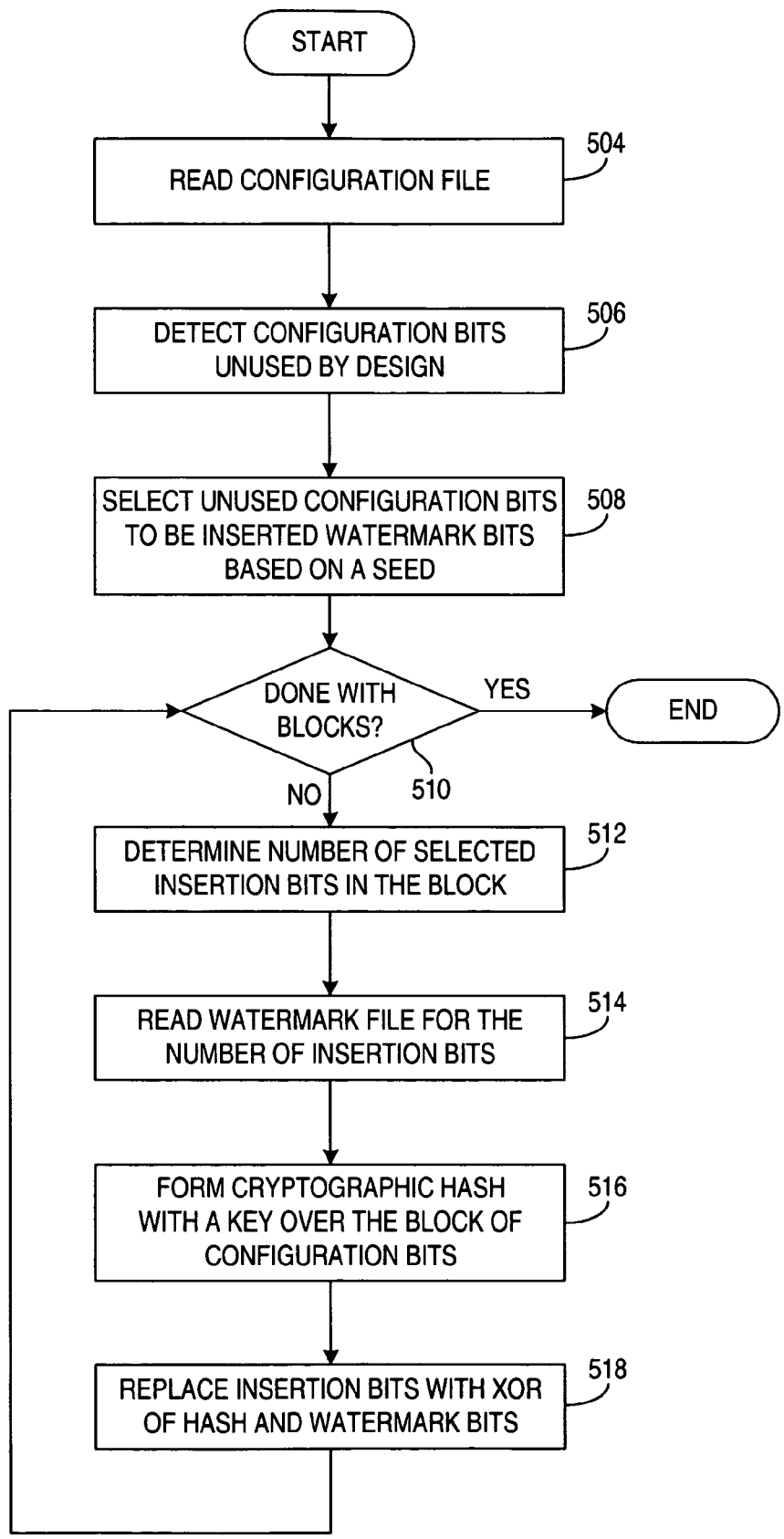
FIG. 5 is a flow diagram of an example process for inserting a watermark in an FPGA configuration file in accordance with various embodiments of the invention.

FIG. 5 is a flow diagram of an example process for inserting a watermark in an FPGA configuration file. The original configuration file is modified to insert a scrambled watermark into a selected subset of the bits that are unused in defining the function of the configured design.

The original configuration file is read at step 504. Some of the bits in the configuration file are not used to define the function of the configured design. At step 506, these unused bits are identified. In one embodiment the used bits may be determined during the mapping operation that generates the configuration bitstream. The used bits may be specified in a map and later referenced as needed. Further details on the identification of used bits during the generation of the configuration bitstream are described in commonly assigned, co-pending patent application by Cameron D. Patterson et al., entitled, "Method and System For Generating A Bitstream View of a Design", which was filed concurrently with this application, and has now issued as U.S. Pat. No. 7,343,578. This patent is incorporated herein by reference.

At step 508 a subset of the unused bits is selected for insertion of the watermark. The subset may be all the unused bits. In one embodiment, a user may specify a list of specific locations in which the watermark bits are to be inserted. Alternatively, in another embodiment a user-provided seed may be used to select the insertion bits. The seed is used to initialize a random number generator that generates a pseudo-random sequence, and the pseudo-random sequence may be used to select the subset of the bits. In one embodiment when the result of an AND of three bits from a pseudo-random value is asserted then an unused bit is selected, so that approximately one eighth of the unused bits are selected for insertion of the watermark. The pseudo-random selection of unused bits adds an extra level of concealment for the watermark.

A cryptographic hash function produces a set of hash output bits from a key and a set of input bits of any length. In one embodiment, the cryptographic hash is performed on individual blocks of bits. For encryption security, the blocks should have a minimum size of approximately 128 bits to reduce the risk of an undetectable modification to the bitstream. A cryptographic hash function produces a limited number of hash output bits. For example SHA-1 has 160 hash output bits. For a block size larger than the output width of the cryptographic hash function, the hash output can be used multiple times to scramble the entire block. However, reusing a hash output increases the risk that the hash output value can be discovered by an attacker, so typically the block size should not exceed the output width of the cryptographic hash function.

At step 510 a check is made whether the watermark insertion process is complete with all blocks done.

At step 512, the number of selected insertion bits is determined for the block. In one embodiment when there are no insertion bits for a block, the calculation of the cryptographic hash and the insertion of scrambled watermark bits are skipped for the block.

At step 514, the watermark file is read for the number of insertion bits for the block.

At step 516, the cryptographic hash is calculated for the block. The input for the cryptographic hash is a user provided key, the block of data from the configuration file, an optional internally generated block index, and optionally results from the cryptographic hash for the prior block. The internally generated block index frustrates an attack to discover the hash output for recurring values of blocks of the configuration bitstream. To further frustrate an attack to discover the hash output for recurring values of blocks between different configuration bitstreams, the key may be a combination of a secret key and a key specific to an individual configuration bitstream. The key specific to an individual configuration bitstream may be the top level module name, the name of the configuration file, or a portion of the name of the configuration file. The secret key is given only to trusted entities. The secret key may be used to insert a watermark in a plurality of configuration files.

The option to not include results from the cryptographic hash for the prior block in the calculation of the current block may allow some watermark information to be extracted after the modification to the bitstream, and may permit localization of any modification to the relevant blocks. The option to include the results for the prior block permits the checking of the occasional block that does not contain any unused bits or any selected bits.

The selection bits must have a known value before being input into the cryptographic hash function to be able to later successfully extract the watermark. Since all selection bits are unused bits and unused bits are given a default value of zero, the selection bits typically have a known value of zero. For one embodiment the selection bits are masked before being input into the cryptographic hash function.

At step 518, the insertion bits in the block of configuration data are replaced with the XOR of the watermark bits and the output of the cryptographic hash.

Figure 6:
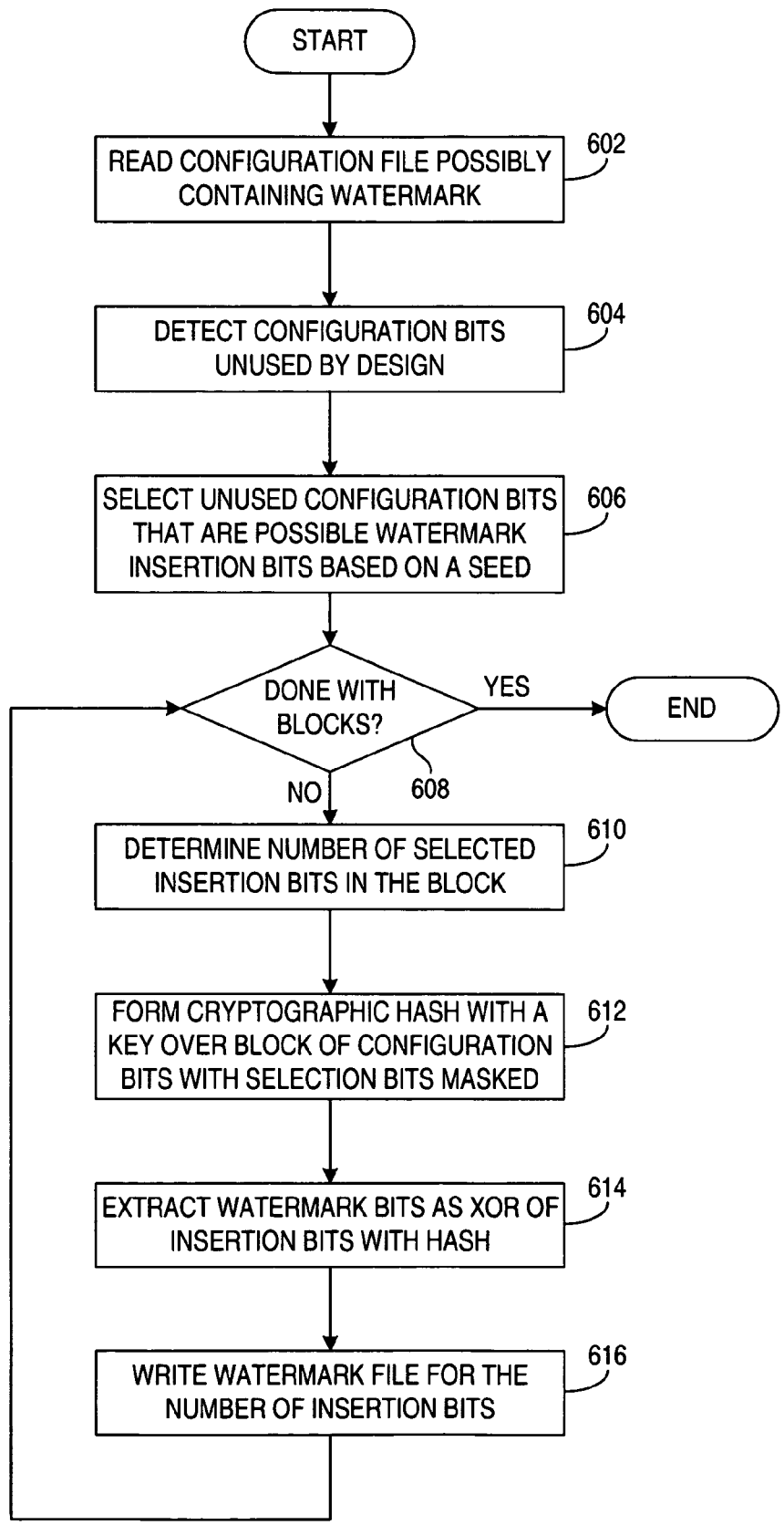
FIG. 6 is a flow diagram of an example process for extracting a watermark from an FPGA configuration file in accordance with various embodiments of the invention.

FIG. 6 is a flow diagram of an example process for extracting a watermark from an FPGA configuration file.

At step 602, the configuration file is read. The extraction of a concealed non-intrusive watermark is attempted for this file.

At step 604 the configuration bits that are unused to implement the configured design are identified. In one embodiment a file identifying used bits is associated with the configuration file. The bits that are not identified as used bits in this file are the unused bits.

At step 606 a subset of the unused bits are selected, with the subset expected to contain the watermark bits. These bits are selected in the same manner as the watermark insertion process based on a seed provided by the user. For the watermark to be successfully extracted, the user must provide the seed that was used during watermark insertion.

Step 608 is a decision that determines whether watermark extraction is complete by testing whether all blocks of configuration data have been processed.

At step 610 the number of insertion bits is determined in the same manner as the watermark insertion process. In one embodiment when there are no insertion bits for a block, the calculation of the cryptographic hash is skipped for the block.

At step 612 the cryptographic hash is calculated over the block of configuration data, the optional block index, optional results from the cryptographic hash for the prior block, and a key provided by the user. The key may be a combination of a secret key and a key specific to the individual bitstream. The block index and hash results from the prior block are included if they were included during watermark insertion. To successfully extract the watermark the user must provide the same key that was used during the watermark insertion process. Before the configuration data is given to the cryptographic hash function, the selection bits are masked to the default value for unused bits. During a successful extraction of a watermark, the cryptographic hash function generates the same hash output for each block of configuration data as was generated during the insertion of the watermark.

At step 614 the insertion bits are extracted from the block of configuration data and an XOR operation is performed for these bits with the cryptographic hash output. The resulting bits are the extracted watermark bits for the block.

At step 616 the extracted watermark bits for the block are written to the extracted watermark file.

For a successful watermark extraction the watermark file contains the plain text version of the concealed watermark. When watermark extraction is unsuccessful the watermark file generally contains data that is unrecognizable.

Figure 7:
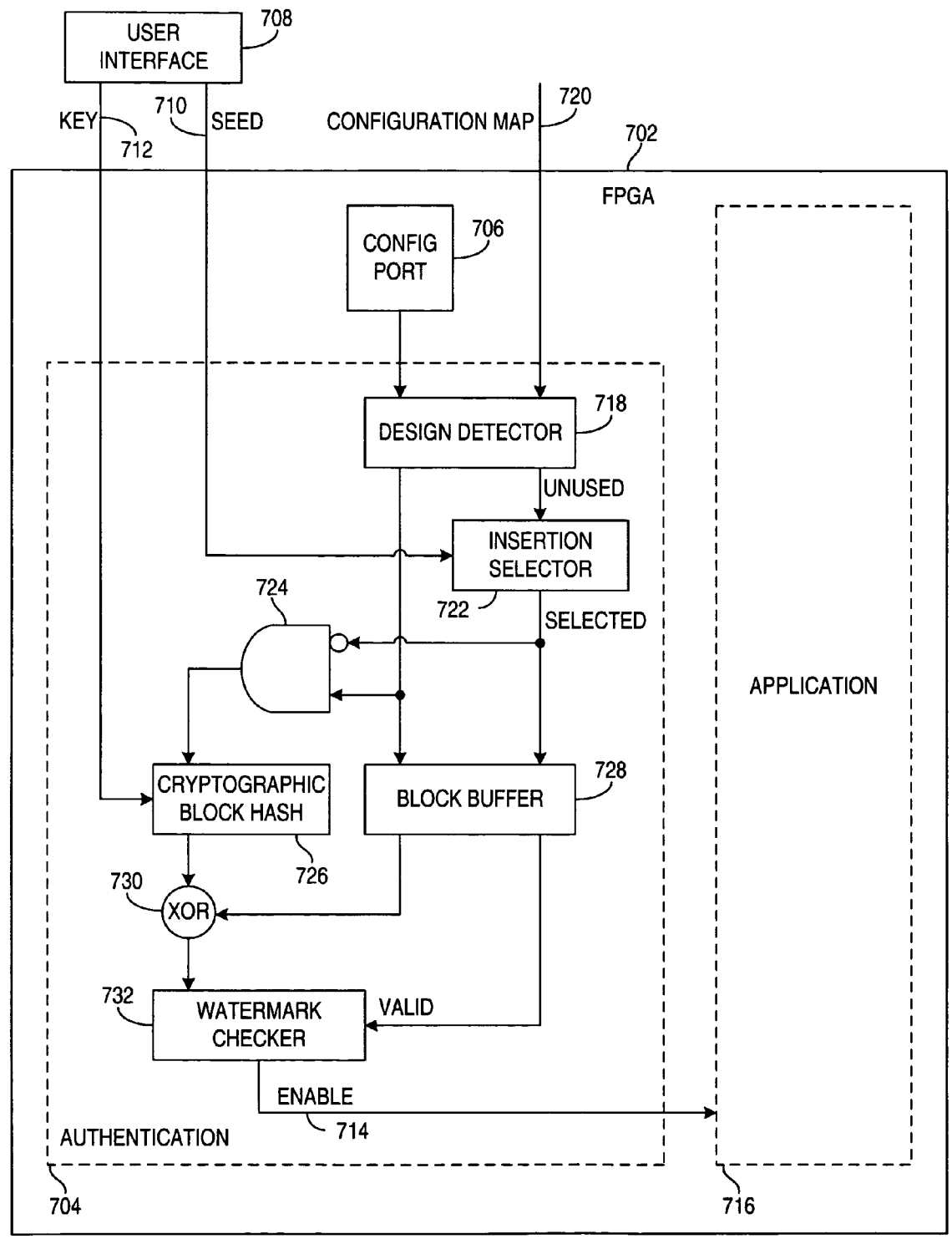
FIG. 7 is a block diagram of system for authenticating a design implemented on an FPGA in accordance with various embodiments of the invention.

FIG. 7 is a block diagram of system for authenticating a design implemented on an FPGA 702 in accordance with various embodiments of the invention. Authentication logic 704 within the FPGA 702 reads the configuration data for the FPGA 702 via internal access to the configuration port 706. The user interface 708 permits the user to supply the seed 710 and the key 712 to the authentication logic 704.

When the authentication logic 704 determines that the watermark passes the authentication check, the authentication logic 704 asserts an enable signal 714 to the application logic 716. The application logic is designed to refuse to perform its function unless the authentication logic 704 provides an asserted enable signal 714. Any modification to the configuration data for the FPGA 702 generally results in the authentication logic 704 generating a de-asserted enable signal 714 and thus the application logic 716 refusing to perform its function.

The authentication logic 704 may be dedicated hardware within the FPGA 702, or alternatively implemented in the programmable logic portion of the FPGA 702. When implemented in the programmable logic portion of the FPGA 702, the authentication logic 704 also checks that the authentication logic 704 has not been modified.

The design detector 718 uses a configuration map input on line 720 to the FPGA 702 to determine the used configuration bits. In another embodiment, the configuration map may be included in a configured memory within the FPGA 702. To include the configuration map within the FPGA, the configuration bitstream is generated for the authentication logic 704 and the application logic 716, and the memory for the configuration map is considered used. After determining the unused bits in the resulting design, the configuration bitstream is modified to include the data for the configuration map without changing any configuration bits from unused to used or vice versa. The watermark is then inserted into selected unused bits of the configuration data using the watermark insertion process.

The insertion selector 722 selects based on the seed 710 a subset of the unused bits that are expected to contain the watermark.

The selected bits are masked by the AND gate 724 before the configuration data is sent to the cryptographic block hash 726. The bits that are not selection bits are not modified by the AND gate 724. The cryptographic block hash 726 calculates a cryptographic hash function over each block of masked configuration data, an optional block index, optionally results from the cryptographic hash for the prior block, and the user provided key.

The block buffer 728 is a FIFO that synchronizes the cryptographic hash 726 output with the configuration bitstream and the selection bits.

The XOR gate 730 unscrambles the watermark. The watermark checker 732 determines whether the unscrambled watermark matches an expected watermark for the selection bits. The expected watermark may be a repeating string such as, "This design is to be used only under the terms of a license from Xilinx" designed into the watermark checker 732. This expected watermark must be the actual watermark that was inserted during the watermark insertion process. When the entire configuration bitstream passes the check, the watermark checker 732 generates an asserted enable output 714.

Figure 8:
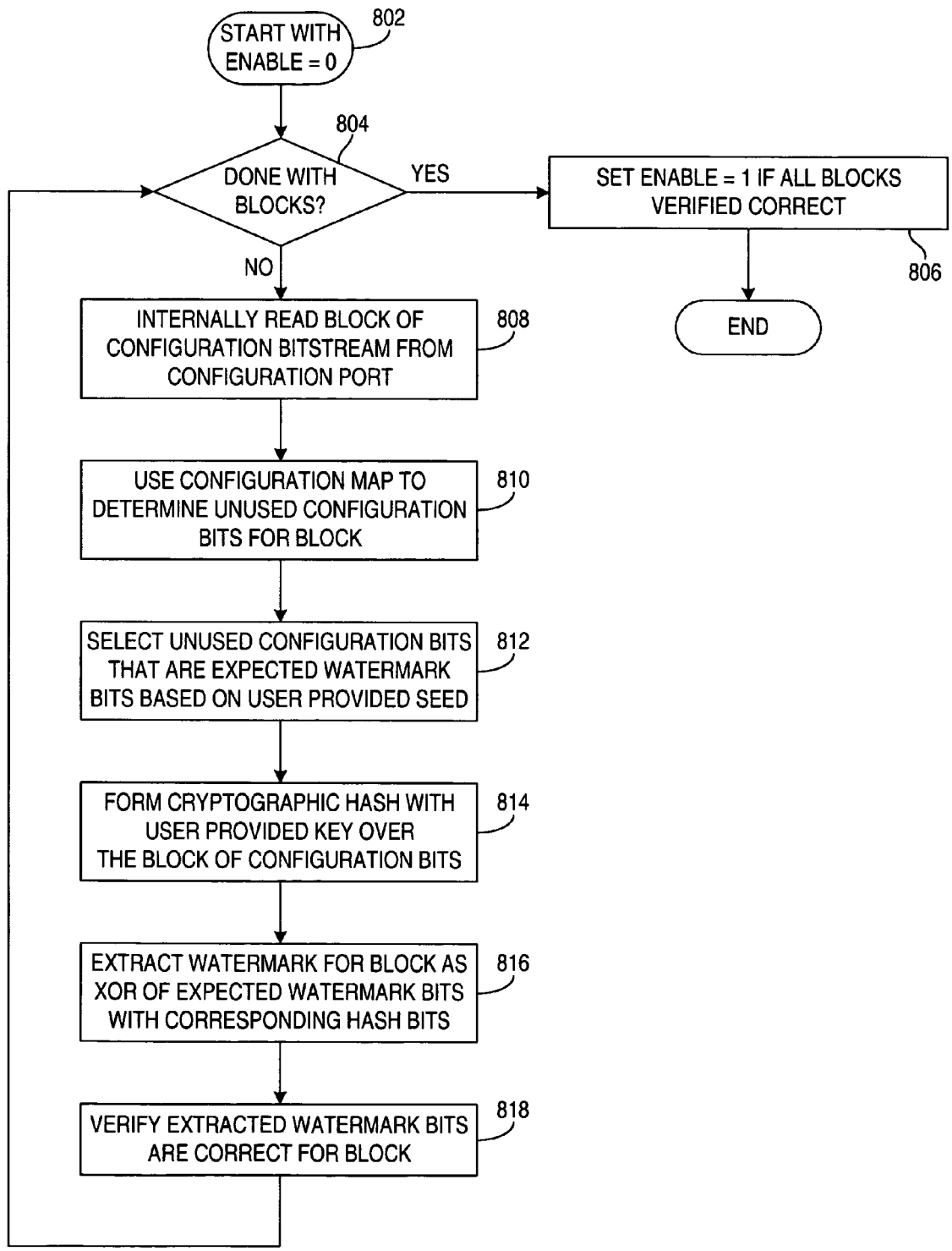
FIG. 8 is a flow diagram of an example process for authenticating a design implemented on an FPGA in accordance with various embodiments of the invention.

FIG. 8 is a flow diagram of an example process for authenticating a design implemented on an FPGA in accordance with various embodiments of the invention. The process starts with the authentication logic initializing the application enable signal to zero at step 802. A decision 804 checks whether every block of configuration data has been authenticated. When all blocks have been checked, at step 806 the enable signal is set to one if all blocks passed authentication, otherwise the enable signal remains zero.

The iteration to check each block begins at step 808 with the authentication logic reading a block of configuration data via internal access to the configuration port. For encryption security the block size may depend upon the cryptographic hash function used as discussed earlier. The block may be a frame of FPGA configuration data. A frame is the values from a column of the array of configuration memory cells.

At step 810 the configuration map supplied externally or internally is used to determine the unused configuration bits in the block. In one embodiment, when there are no unused bits in a block then the block passes authentication and the next block is considered. A subset of these unused configuration bits is selected at step 812. This subset of the unused bits is expected to contain the watermark. The selection is based upon a user provided seed. In one embodiment when there are no selected bits in a block then the block passes authentication and the next block is considered.

At step 814 a cryptographic hash function is calculated over the block of configuration data, a user provided key, and optionally a block index. In one embodiment, the input to the cryptographic hash function additionally includes results from the cryptographic hash for the prior block. At step 816 the XOR of the cryptographic hash function output and the expected watermark bits yields the extracted watermark for the block.

The extracted watermark for the block is verified to match the expected watermark at step 818.

The present invention is believed to be applicable to a variety of systems for protected configuration data for programmable logic devices and has been found to be particularly applicable and beneficial in concealing watermarks in configuration data. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for embedding identifier information in a configuration bitstream for a programmable logic device (PLD), wherein the configuration bitstream implements a design, comprising:

providing for determining bits in a configuration bitstream that are unused in implementing the design on a PLD, wherein the bits are unused bits;

wherein the providing for determining the unused bits includes using a configuration bit definition in determining whether a bit is essential or unused, and the configuration bit definition is a configuration bit description equation;

providing for encrypting the identifier information;

providing for selecting a subset of the unused bits using a function; and providing for placing the encrypted identifier information in the selected subset of unused bits, wherein the providing for selecting a subset of the unused bits includes initializing a random number generator with a seed, generating a pseudo-random sequence of bits by the random number generator, and selecting the subset of bits using the pseudo-random sequence of bits.

2. The method of claim 1, wherein the identifier information includes a design revision number.

3. The method of claim 2, wherein the identifier information includes a design name.

4. The method of claim 3, wherein the identifier information includes ownership information.

5. The method of claim 1, wherein the identifier information includes a functional description of the design.

6. The method of claim 1, wherein the identifier information includes information that identifies a target hardware platform for implementation of the design.

7. The method of claim 1, wherein the providing for encrypting step includes applying a cryptographic hash function to the identifier information.

8. A method for extracting identifier information from a configuration bitstream for a programmable logic device (PLD), wherein the configuration bitstream implements a design, the method comprising:

determining bits in a configuration bitstream that are unused in implementing the design on a PLD, wherein the bits are unused bits;

wherein the determining the unused bits includes using a configuration bit definition in determining whether a bit is essential or unused, and the configuration bit definition is a configuration bit description equation;

selecting a subset of the unused bits using a pseudo-random function;

decrypting information in the selected subset of unused bits; and outputting the decrypted information.

9. The method of claim 8, wherein the decrypting step includes applying a cryptographic hash function to the information in the selected subset of unused bits.

10. The method of claim 8, wherein the step of selecting a subset of the unused bits includes initializing a random number generator with a seed, generating pseudo-random sequence of bits by the random number generator, and selecting the subset of bits using the pseudo-random sequence of bits.

11. A method for embedding identifier information in a configuration bitstream and extracting the identifier information from a configuration bitstream for a programmable logic device (PLD), wherein the configuration bitstream implements a design, the method comprising:

embedding the identifier information by, determining bits in a configuration bitstream that are unused in implementing the design on a PLD, wherein the bits are unused bits;

wherein the determining the unused bits includes using a configuration bit definition in determining whether a bit is essential or unused, and the configuration bit definition is a configuration bit description equation;

encrypting the identifier information;

selecting a subset of the unused bits using a pseudo-random function; and placing the encrypted identifier information in the selected subset of unused bits; and extracting the identifier information by,
determining bits in a configuration bitstream that are unused in implementing the design on a PLD;
selecting a subset of the unused bits using the pseudo-random function;
decrypting information in the selected subset of unused bits; and
outputting the decrypted information.

12. The method of claim 11, wherein the encrypting step includes applying a cryptographic hash function to the identifier information, and the decrypting step includes applying an inverse of the cryptographic hash function to the information in the selected subset of unused bits.

13. The method of claim 11, wherein each step of selecting a subset of the unused bits includes initializing a random number generator with a seed, generating pseudo-random sequence of bits by the random number generator, and selecting the subset of bits using the pseudo-random sequence of bits.

14. An apparatus for extracting identifier information from a configuration bitstream for a programmable logic device (PLD), wherein the configuration bitstream implements a design, comprising:
means for determining bits in a configuration bitstream that are unused in implementing the design on a PLD, wherein the bits are unused bits;
wherein the means for determining the unused bits uses a configuration bit definition in determining whether a bit is essential or unused, and the configuration bit definition is a configuration bit description equation;
means for selecting a subset of the unused bits using a pseudo-random function;
means for decrypting information in the selected subset of unused bits; and
means for outputting the decrypted information.

15. An apparatus for embedding identifier information in a configuration bitstream and extracting the identifier information from a configuration bitstream for a programmable logic device (PLD), wherein the configuration bitstream implements a design, comprising:
means for embedding the identifier information, including,
means for determining bits in a configuration bitstream that are unused in implementing the design on a PLD, wherein the bits are unused bits;
wherein the means for determining the unused bits uses a configuration bit definition in determining whether a bit is essential or unused, and the configuration bit definition is a configuration bit description equation;
means for encrypting the identifier information;
means for selecting a subset of the unused bits using a pseudo-random function; and
means for placing the encrypted identifier information in the selected subset of unused bits; and
means for extracting the identifier information including,
means for determining bits in a configuration bitstream that are unused in implementing the design on a PLD;
means for selecting a subset of the unused bits using the pseudo-random function;
means for decrypting information in the selected subset of unused bits; and
means for outputting the decrypted information.

16. A system for embedding identifier information in a configuration bitstream for a programmable logic device (PLD), wherein the configuration bitstream implements a design, comprising:
a design detector configured to generate data that identifies bits in a configuration bitstream that are unused in implementing the design on a PLD, wherein the bits are unused bits;
wherein the design detector uses a configuration bit definition in determining whether a bit is essential or unused, and the configuration bit definition is a configuration bit description equation;
an encryptor circuit arrangement configured to receive the identifier information and generate encrypted identifier information;
an insertion selector coupled to the design detector and to the encryptor circuit arrangement, the insertion selector arranged to select a subset of the unused bits using a pseudo-random function and write the encrypted identifier information in the selected subset of unused bits in the configuration bitstream.

17. The system of claim 16, wherein the encryptor circuit arrangement comprises:
a cryptographic hash logic circuit arranged to receive an input key and generate pseudo-random data from the key; and
an XOR logic circuit coupled to the cryptographic hash logic circuit, the XOR logic circuit arranged to receive as input the identifier information and output the encrypted identifier information as an XOR function of the input identifier information and pseudo-random data from the cryptographic hash logic circuit.

18. A system for extracting encrypted identifier information from a configuration bitstream for a programmable logic device (PLD), wherein the configuration bitstream implements a design, comprising:
a design detector configured to generate data that identifies bits in a configuration bitstream that are unused in implementing the design on a PLD, wherein the bits are unused bits;
wherein the design detector uses a configuration bit definition in determining whether a bit is essential or unused, and the configuration bit definition is a configuration bit description equation;
a selector arrangement coupled to the design detector, the selector arrangement configured to select a subset of the unused bits using a pseudo-random function and generate data identifying the selected subset of unused bits in the configuration bitstream; and
a decryptor circuit arrangement coupled to the selector arrangement and arranged to receive the configuration bitstream, the decryptor circuit arrangement configured to decrypt information in the selected subset of unused bits of the configuration bitstream and output decrypted identifier information.

19. The system of claim 18, wherein the decryptor circuit arrangement comprises:
a cryptographic hash logic circuit coupled to the selector arrangement and arranged to receive an input key, the selected subset of unused bits, and the data identifying the selected subset of unused bits, and the cryptographic hash logic circuit configured to apply a cryptographic hash function to the selected subset of unused bits using the key and generate output data; and
an XOR logic circuit coupled to the cryptographic hash logic circuit and arranged to receive the selected subset of unused bits and the output data from the cryptographic hash logic circuit, the XOR logic circuit configured to output decrypted identifier information as an XOR function of the output data from the cryptographic hash logic circuit and the selected subset of unused bits.

* * * * *